United States Patent
Blanton et al.

(10) Patent No.: US 11,168,931 B2
(45) Date of Patent: Nov. 9, 2021

(54) VAPOR COMPRESSION SYSTEM WITH REHEAT COIL

(71) Applicant: Johnson Controls Technology Company, Auburn Hills, MI (US)

(72) Inventors: Norman J. Blanton, Norman, OK (US); Stephen C. Wilson, Oklahoma City, OK (US); Curtis W. Caskey, Dallastown, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 130 days.

(21) Appl. No.: 15/897,874

(22) Filed: Feb. 15, 2018

(65) Prior Publication Data

US 2018/0231293 A1 Aug. 16, 2018

Related U.S. Application Data

(60) Provisional application No. 62/459,457, filed on Feb. 15, 2017.

(51) Int. Cl.

| | |
|---|---|
| F25B 6/02 | (2006.01) |
| F25B 30/02 | (2006.01) |
| F25B 41/04 | (2006.01) |
| F24F 13/30 | (2006.01) |
| F25B 49/02 | (2006.01) |
| F24F 3/153 | (2006.01) |
| F24F 11/00 | (2018.01) |

(52) U.S. Cl.
CPC ............ *F25B 49/027* (2013.01); *F24F 3/153* (2013.01); *F24F 11/0008* (2013.01); *F25B 6/02* (2013.01); *F25B 2600/111* (2013.01); *F25B 2700/02* (2013.01); *F25B 2700/2102* (2013.01); *F25B 2700/21161* (2013.01); *F25B 2700/21173* (2013.01); *Y02B 30/70* (2013.01)

(58) Field of Classification Search
CPC .. F25B 6/02; F25B 30/02; F25B 41/04; F25B 2327/00; F24F 2013/221; F24F 13/30
See application file for complete search history.

(56) References Cited

U.S. PATENT DOCUMENTS

| | | | | |
|---|---|---|---|---|
| 5,052,186 A | * | 10/1991 | Dudley | F24H 4/04 62/215 |
| 5,752,389 A | | 5/1998 | Harper | |
| 6,055,818 A | * | 5/2000 | Valle | F24D 19/1039 62/173 |
| 6,826,921 B1 | * | 12/2004 | Uselton | F24F 3/153 62/176.6 |
| 7,854,140 B2 | | 12/2010 | Lifson et al. | |
| 7,975,495 B2 | * | 7/2011 | Voorhis | F24F 3/153 62/176.6 |
| 8,418,486 B2 | | 4/2013 | Taras et al. | |
| 9,574,782 B2 | | 2/2017 | Ohs | |
| 2008/0302112 A1 | * | 12/2008 | Anderson | F25B 45/00 62/93 |

(Continued)

*Primary Examiner* — Frantz F Jules
*Assistant Examiner* — Erik Mendoza-Wilkenfeld
(74) *Attorney, Agent, or Firm* — Fletcher Yoder, P.C.

(57) ABSTRACT

A vapor compression system that includes a reheat coil that heats a supply air stream flowing across the reheat coil with a refrigerant. A fan forces an environmental air flow across a condenser to remove energy from the refrigerant. A controller adjusts a speed of the fan to control a flow of the refrigerant through the reheat coil.

25 Claims, 6 Drawing Sheets

(56) References Cited

U.S. PATENT DOCUMENTS

| | | | |
|---|---|---|---|
| 2010/0107668 A1* | 5/2010 | Voorhis | F24F 3/153 62/176.3 |
| 2011/0107775 A1* | 5/2011 | Akehurst | F25B 49/022 62/89 |
| 2012/0222438 A1* | 9/2012 | Osaka | B60H 1/0073 62/126 |
| 2014/0075977 A1 | 3/2014 | Elliott et al. | |
| 2014/0260368 A1 | 9/2014 | Wintemute et al. | |
| 2015/0059373 A1* | 3/2015 | Maiello | F25B 49/022 62/115 |

* cited by examiner

VAPOR COMPRESSION SYSTEM WITH REHEAT COIL

CROSS-REFERENCE TO RELATED APPLICATION

This application is a Non-Provisional Application claiming priority to U.S. Provisional Application No. 62/459,457, entitled "MODULATING CONTROL OF AN HGRH (DEHUMIDIFIER) UNIT VIA CONDENSER FAN VFD," filed Feb. 15, 2017, which is hereby incorporated by reference in its entirety for all purposes.

BACKGROUND

The present disclosure relates generally to reheat coils in vapor compression systems.

Heat exchangers are used in heating, ventilation, and air conditioning (HVAC) systems to exchange energy between fluids. Typical HVAC systems have two heat exchangers commonly referred to as an evaporator coil and a condenser coil. The evaporator coil and the condenser coil facilitate heat transfer between air surrounding the coils and a refrigerant that flows through the coils. For example, as air passes over the evaporator coil, the air cools as it loses energy to the refrigerant passing through the evaporator coil. In contrast, the condenser facilitates the discharge of heat from the refrigerant to the surrounding air. Some HVAC systems may include a reheat coil that enables HVAC systems to further condition the air. Unfortunately, refrigerant flow through the reheat coil is typically controlled with one or more modulating valves or two-position valves.

SUMMARY

The present disclosure relates to a vapor compression system. The vapor compression system includes a reheat coil that heats a supply air stream flowing across the reheat coil with a refrigerant. A fan forces an environmental air flow across a condenser to remove energy from the refrigerant. A controller adjusts a speed of the fan to control a flow of the refrigerant through the reheat coil.

The present disclosure also relates to a vapor compression system that includes an evaporator coil that cools supply air with a refrigerant. The vapor compression system also includes a reheat coil that heats the supply air with the refrigerant. A compressor supplies the evaporator coil and the reheat coil with the refrigerant. A fan forces an environmental air flow across a condenser to remove energy from the refrigerant. A controller adjusts a speed of the fan to control a flow of the refrigerant through the reheat coil.

The present disclosure also relates to a vapor compression system with a reheat coil that heats a first fluid flowing across the reheat coil with a refrigerant. A first fan forces a second fluid across a condenser to remove energy from the refrigerant. A second fan forces the second fluid across the condenser to remove energy from the refrigerant. A controller controls a flow of the refrigerant through the reheat coil by controlling a first speed of the first fan and/or a second speed of the second fan.

DRAWINGS

DETAILED DESCRIPTION

Figure 1:
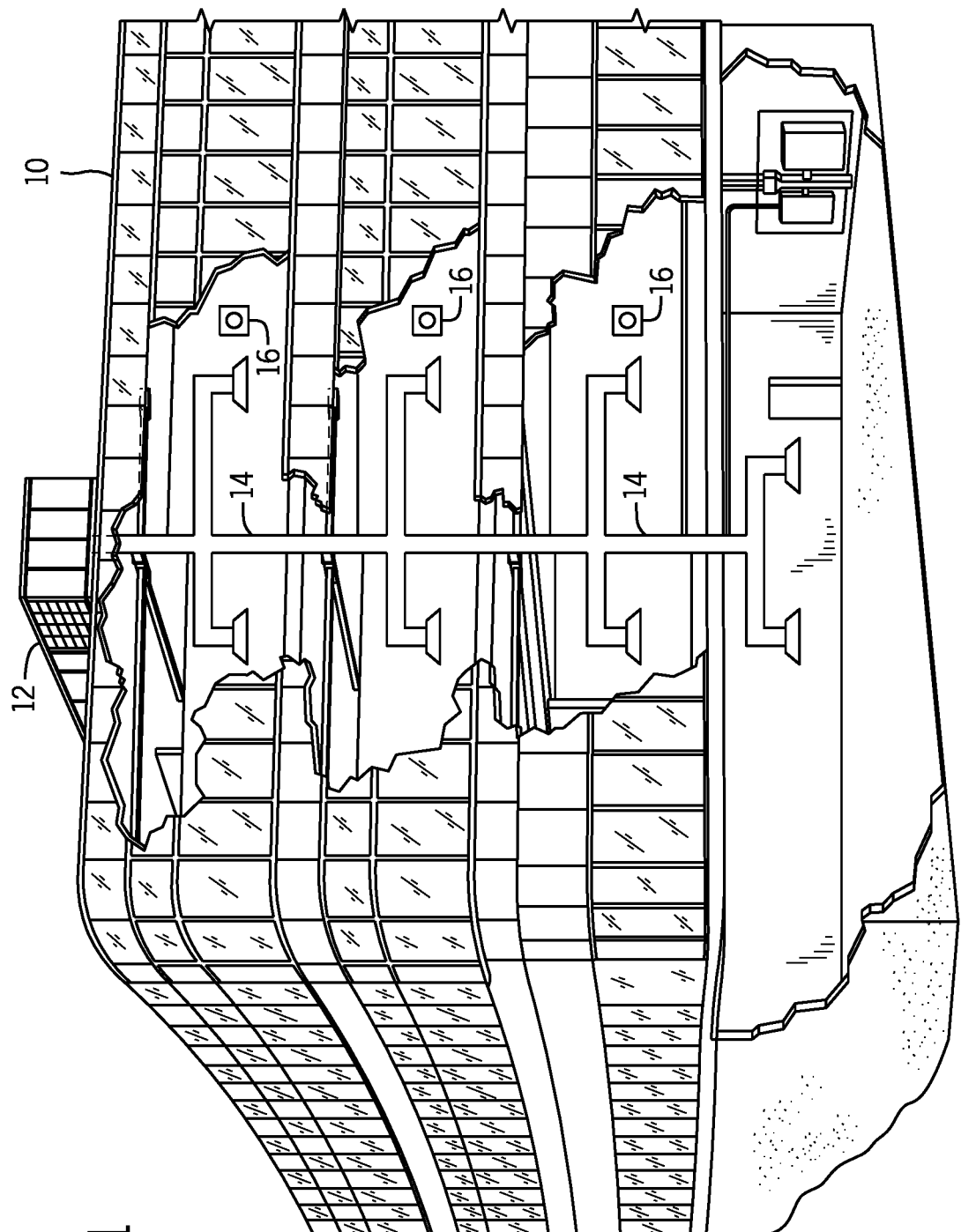
FIG. 1 is a perspective view of an embodiment of a building that may utilize a heating, ventilation, and air conditioning (HVAC) system in a commercial setting, in accordance with an aspect of the present disclosure.

Embodiments of the present disclosure include an HVAC system with a reheat coil configured to adjust the humidity level and temperature of a supply air stream. During operation of the HVAC system, a supply air stream flows across an evaporator coil and the reheat coil. As the supply air stream flows across the evaporator coil, the supply air stream cools as the supply air stream loses energy to cold refrigerant circulating through the evaporator coil. As the supply air stream cools moisture in the supply air stream condenses and is removed. The supply air stream may then be partially reheated in the reheat coil by absorbing energy from a hot refrigerant before circulating through an enclosed space, such as a home or office building. Reheating the supply air stream changes the relative humidity of the air and provides a comfortable temperature to the space.

As described in further detail below, to control the flow of refrigerant through the reheat coil, the HVAC system controls operation of one or more fans, which control heat transfer from the condenser to the surrounding air. In operation, the fans force air over the condenser. As the air flows over the condenser, the air absorbs energy from the refrigerant. By controlling the amount of heat transfer from the condenser to the surrounding air, the controller is able to control the pressure of the refrigerant in the condenser. The pressure of the refrigerant in the condenser in turn controls how much refrigerant flows through the condenser and how much refrigerant flows through the reheat coil. As described below, less refrigerant flow through the condenser forces more refrigerant to flow through the reheat coil. Similarly, an increase in refrigerant flow through the condenser decreases refrigerant flow through the reheat coil.

For example, reducing the speed of the fan(s) reduces the amount of airflow across the condenser. Less airflow across the condenser reduces heat transfer from the refrigerant within the condenser to the surrounding air, and thus reduces the amount of refrigerant that condenses from a vapor to a liquid. A high concentration of refrigerant vapor within the condenser increases the refrigerant pressure within the condenser, which thereby reduces refrigerant flow through the condenser. Accordingly, more refrigerant exiting the compressor is diverted into the reheat coil instead of flowing through the condenser. In contrast, by increasing the speed of the fan, more air is forced across the condenser, which increases heat transfer from the refrigerant. The increased heat transfer from the refrigerant reduces the pressure of the refrigerant as more vapor condenses into liquid in the condenser. The lower pressure draws more refrigerant from the compressor, thus diverting the refrigerant away from the reheat coil. In this way, the HVAC system is able to control the amount of refrigerant flowing through the reheat coil by controlling the pressure of the refrigerant in the condenser. The HVAC system is therefore able to control refrigerant flow to the reheat coil using one or more fans instead of a modulating valve(s).

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other coils of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
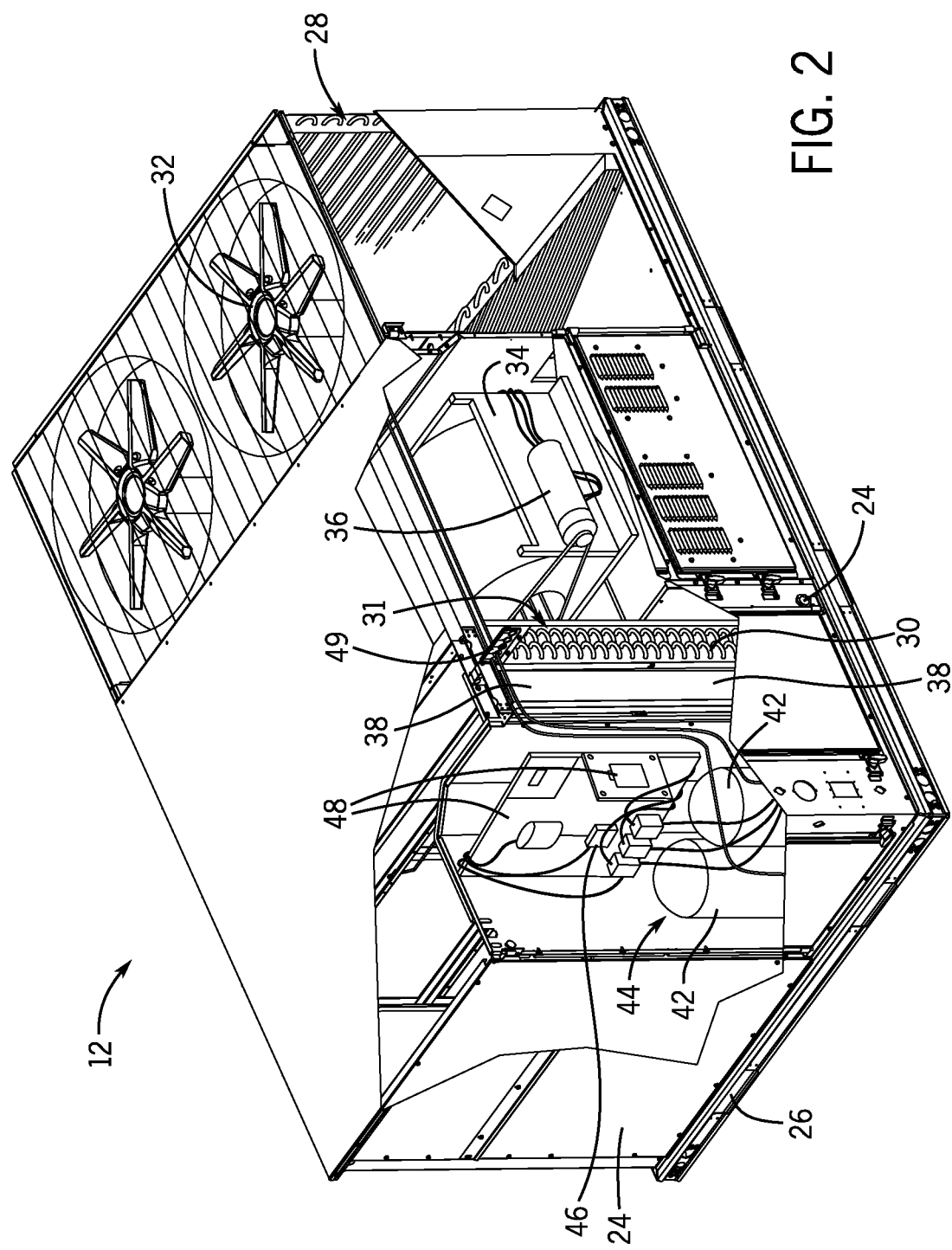
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, reciprocating compressors, or modulating compressors. In some embodiments, the compressors 42 may include a pair of hermetic direct drive him arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
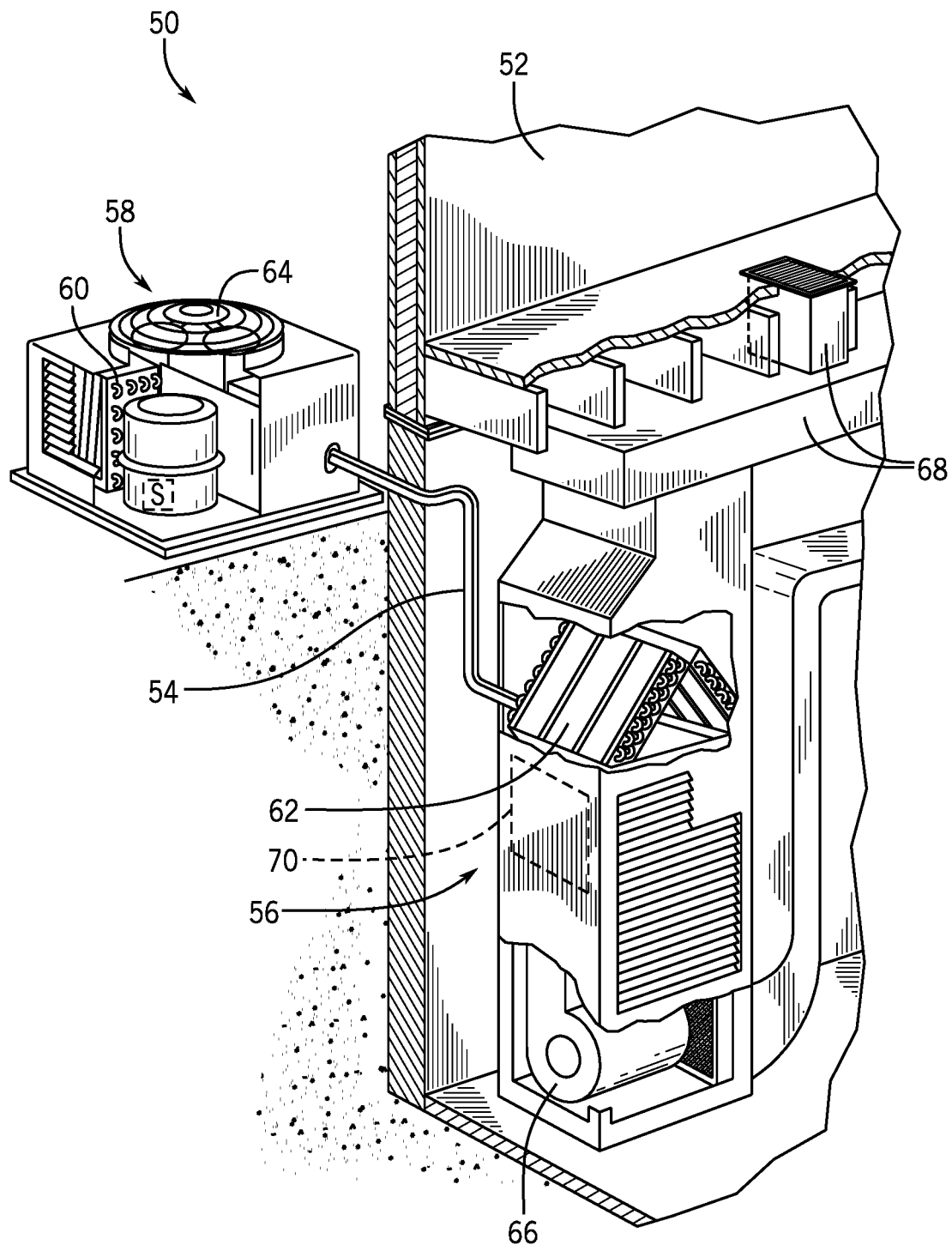
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small differential temperature amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52. Similarly, an electric furnace may be used to heat the air directly.

Figure 4:
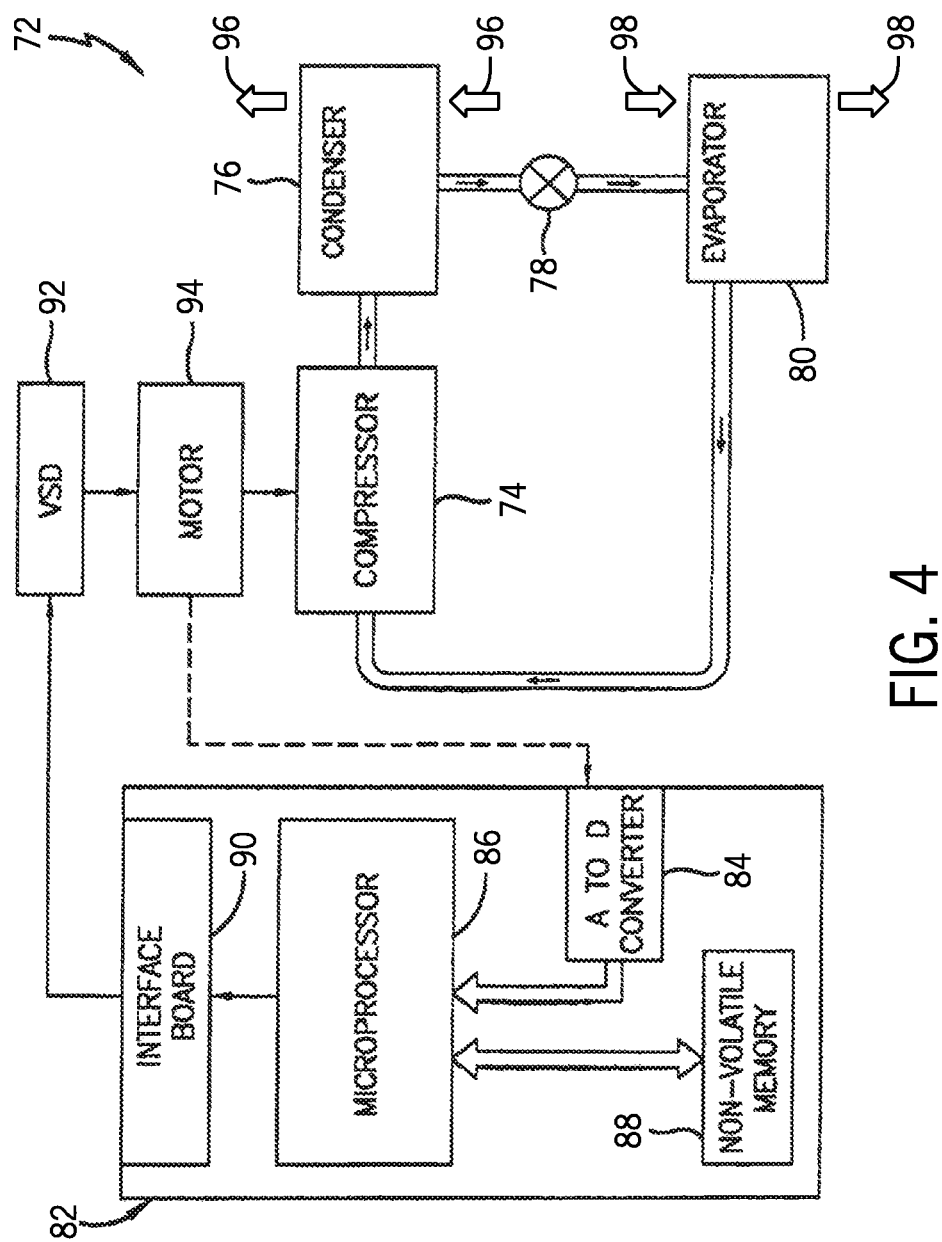
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a nonvolatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
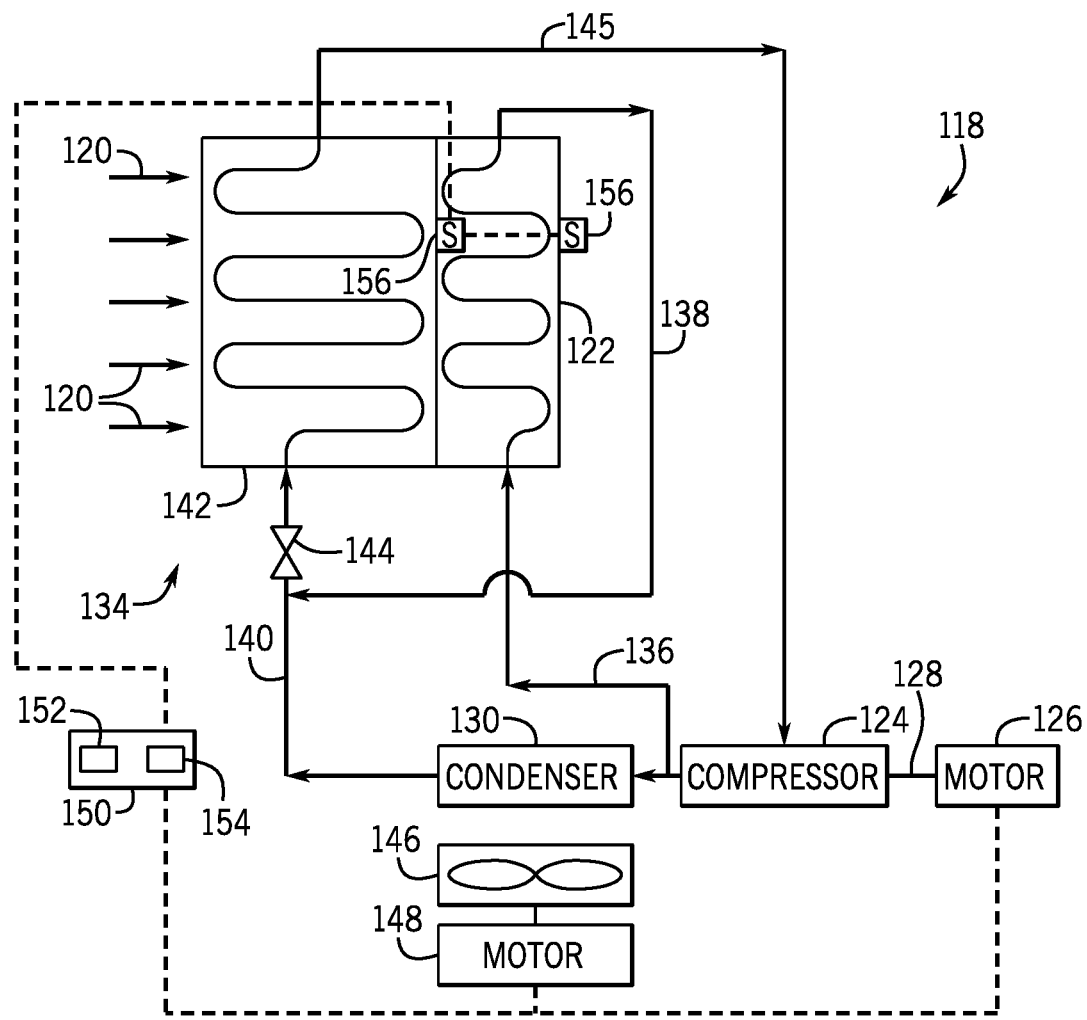
FIG. 5 is a schematic of an embodiment of an HVAC system, in accordance with an aspect of the present disclosure.

FIG. 5 is an embodiment of a vapor compression system 118 that can be used in any of the systems described above in FIGS. 1-4. In operation, the vapor compression system 118 circulates a refrigerant in a refrigeration loop to change a temperature of a supply air stream 120. In addition to cooling the supply air stream 120, the vapor compression system 118 includes a reheat coil/reheat coil 122 that enables the vapor compression system 118 to heat the supply air stream 120 as well as changes the relative humidity of the supply air stream 120.

The refrigeration loop begins with a compressor 124 that compresses and drives refrigerant through the refrigeration loop using power generated by the motor 126. As illustrated, a motor 126 couples to the compressor 124 with a shaft 128. As the motor 126 rotates the shaft 128, the motor 126 transfers power through the shaft 128 to the compressor 124. The motor 126 may be an electric motor, gas powered motor, or diesel motor. After passing through the compressor 124, the refrigerant flow splits with a portion of the refrigerant flowing to a condenser 130 and another portion of the refrigerant flowing to the reheat coil 122 of an evaporator system 134. As illustrated, line 136 connects the compressor 124 to the reheat coil 122. In the reheat coil 122, the refrigerant exchanges energy with the supply air stream 120. More specifically, the refrigerant flowing across the reheat coil 122 loses energy to the supply air stream 120 as the energy warms and dehumidifies the supply air stream 120.

After passing through the reheat coil 122, the refrigerant flows through line 138 where the refrigerant rejoins the refrigerant exiting the condenser 130 through line 140. The combined refrigerant from lines 138 and 140 then flows through a thermal expansion valve 144 (TXV). The thermal expansion valve 144 enables a rapid drop in the pressure of the refrigerant, which reduces the temperature of the refrigerant. The refrigerant then passes through one or more coils in an evaporator coil 142 of the evaporator system 134 to remove energy from the supply air stream 120. As the refrigerant absorbs energy from supply air stream 120, the refrigerant evaporates. Some or all of the refrigerant then exits the evaporator coil 142 as a vapor and is returned to the compressor 124 through return line 145. The refrigeration loop then begins again with the compressor 124 pumping the refrigerant.

As explained above, the reheat coil 122 and the evaporator coil 142 condition the supply air stream 120 by changing the temperature and humidity of the supply air stream 120. The vapor compression system 118 uses the evaporator coil 142 to cool the supply air stream 120, and the reheat coil 122 to reheat the supply air stream 120 to a desired temperature and to reduce humidity. For example, if the supply air stream 120 is too humid and/or too cold after passing through the evaporator coil 142, the vapor compression system 118 uses the reheat coil 122 to increase the temperature of the supply air stream 120 and change the relative humidity. Accordingly, by including the reheat coil 122, the vapor compression system 118 is able to control/fine-tune the characteristics of the supply air stream 120 exiting the vapor compression system 118.

In order to control how much hot refrigerant flows through the reheat coil 122, the vapor compression system 118 includes a fan 146 driven by a motor 148. In operation, the fan 146 forces air across the condenser 130. The fan 146 blows or draws the air across the condenser 130 to facilitate heat transfer from the refrigerant in the condenser 130 to the air surrounding the condenser 130. As the refrigerant loses energy to the surrounding air, the refrigerant condenses. In other words, the refrigerant changes from a vapor state to a liquid state. As the refrigerant changes states, the pressure of the refrigerant in the condenser 130 changes. In a vapor state, the refrigerant generates more pressure within the condenser 130, but as the refrigerant condenses into a liquid state, the pressure of the refrigerant in the condenser 130 decreases. By controlling the amount of heat transfer from the refrigerant in the condenser 130 to the surrounding air, the vapor compression system 118 is able to control the pressure of the refrigerant in the condenser 130. By controlling the pressure of the refrigerant in the condenser 130, the vapor compression system 118 is able to control how much hot refrigerant is diverted from the compressor 124 to the reheat coil 122.

For example, by reducing the speed of the fan 146, the vapor compression system 118 reduces the amount of airflow across the condenser 130. Reduced airflow across the condenser 130 causes a reduction in heat transfer from the refrigerant to the surrounding air, and thus reduces the amount of refrigerant that changes from a vaporized state to a liquid state inside of the condenser 130. An elevated vapor concentration within the condenser 130 increases the pressure in the condenser 130 and therefore reduces refrigerant flow through the condenser 130. Accordingly, more of the refrigerant exiting the compressor 124 is diverted into line 136 to the reheat coil 122 of the evaporator system 134. In contrast, by increasing the speed of the fan 146, more air is forced across the condenser 130, which increases heat transfer from the refrigerant in the condenser 130 to the surrounding air. The increased heat transfer from the refrigerant in the condenser 130 to the surrounding air reduces the pressure of the refrigerant as the refrigerant condenses. The lower pressure in the condenser 130 then draws more refrigerant from the compressor 124, thus diverting the refrigerant away from the reheat coil 122. Accordingly, by controlling the pressure of the refrigerant in the condenser 130, the vapor compression system 118 is able to control the amount of refrigerant flowing through the reheat coil 122. In this way, the vapor compression system 118 is able to control the flow of refrigerant to the reheat coil 122 without modulating valves.

As explained above, the fan 146 is driven by a motor 148, and the motor 148 is controlled in turn by a controller 150. In the illustrated embodiment, the controller 150 includes a processor 152, such as a microprocessor, and a memory device 154. The controller 150 may also include one or more storage devices and/or other suitable components. The processor 152 may be used to execute software, such as software for controlling the speed of the motor 148, if the motor 148 is a variable speed drive motor (VSD), and/or turning the motor 148 on and off. For example, in some embodiments, the motor 148 may not be a variable speed drive motor. In such an embodiment, the vapor compression system 118 may repeatedly turn the motor 148 on and off to control heat transfer from the refrigerant in the condenser 130 in order to control the flow of refrigerant to the reheat coil 122. In some embodiments, the processor 152 may include multiple microprocessors, one or more "general-purpose" microprocessors, one or more special-purpose microprocessors, and/or one or more application specific integrated circuits (ASICS), or some combination thereof. For example, the processor 152 may include one or more reduced instruction set (RISC) processors.

The memory device 154 may include a volatile memory, such as random access memory (RAM), and/or a nonvolatile memory, such as read-only memory (ROM). The memory device 154 may store a variety of information and may be used for various purposes. For example, the memory device 154 may store processor executable instructions, such as firmware or software, for the processor 152 to execute, such as instructions for interpreting signals from one or more sensors 156. For example, the controller 150 may couple to one or more sensors 156 that provide feedback regarding the humidity and/or temperature of the supply air stream 120 exiting the evaporator coil 142 and/or the reheat coil 122. As the controller 150 receives feedback, the controller 150 may execute instructions stored on the memory device 154 to turn the motor 148 on, turn the motor 148 turn off, increase the speed of the motor 148, or decrease the speed of the motor 148 to control the amount of heat transfer from the refrigerant in the condenser 130.

For example, if the controller 150 receives feedback from the sensor(s) 156 indicating that the supply air stream 120 is too cold and/or too humid, the controller 150 may turn the motor 148 off or reduce the speed of the motor 148 to decrease heat transfer from the refrigerant in the condenser 130. The decrease in heat transfer increases the pressure of the refrigerant in the condenser 130 forcing more of the refrigerant to flow through the reheat coil 122, thus warming and dehumidifying the supply air stream 120. Likewise, if the controller 150 receives feedback from the sensor(s) 156 indicating that the supply air stream 120 is too warm, the controller 150 may turn the motor 148 on or increase the speed of the motor 148 to increase heat transfer from the refrigerant in the condenser 130, and thus divert refrigerant flow away from the reheat coil 122.

Figure 6:
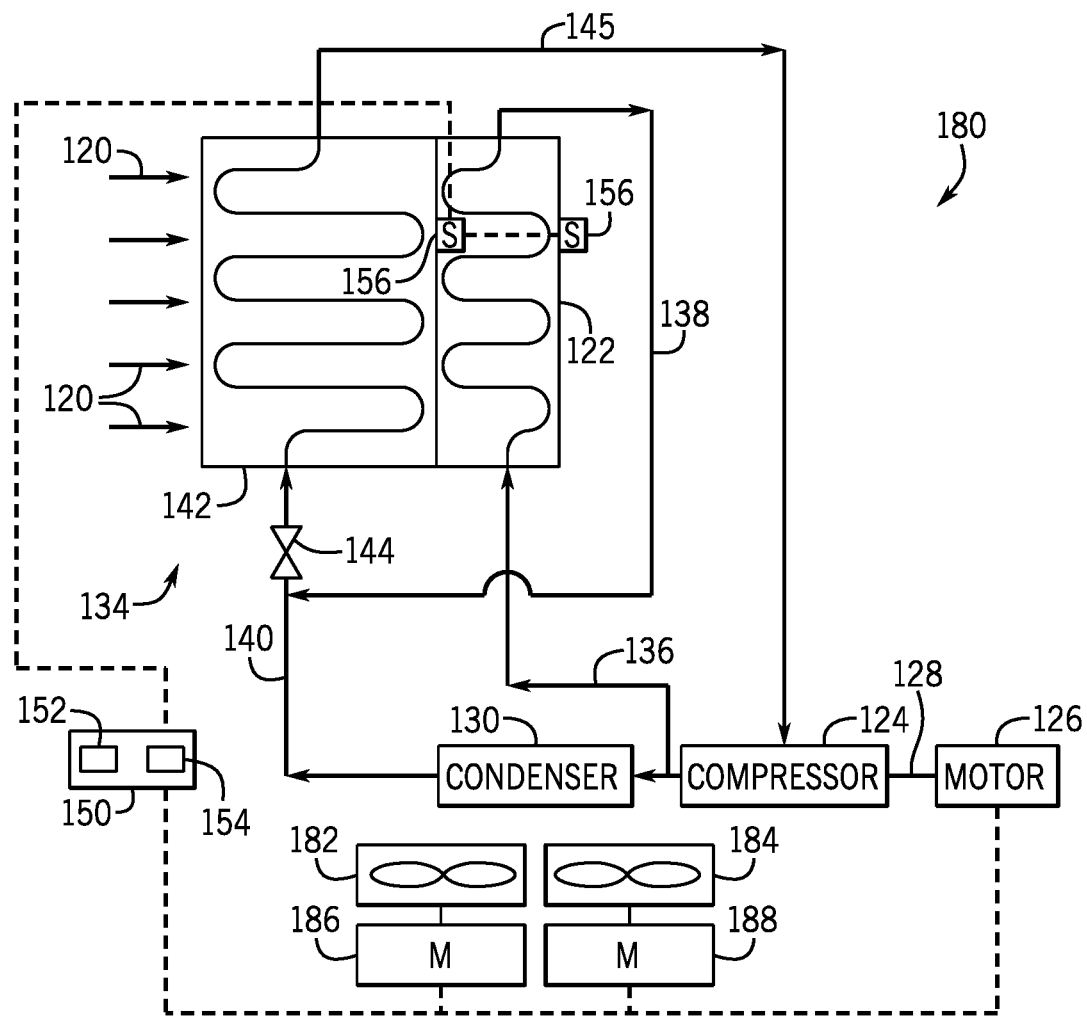
FIG. 6 is a schematic of an embodiment of an HVAC system, in accordance with an aspect of the present disclosure.

FIG. 6 is an embodiment of the vapor compression system 118 similar to that described above in FIG. 5. However, instead of the single fan 146 of FIG. 5, an HVAC system 180 shown in FIG. 6 includes multiple fans that may be individually controlled to increase or decrease the flow of refrigerant to the reheat coil 122. In the present embodiment, the vapor compression system 118 includes a first fan 182 and a second fan 184. However, it should be understood that in other embodiments, the vapor compression system 118 may include more than two fans. Fans 182 and 184 may be the same or different sizes depending on the design of the vapor compression system 118. For example, the fan 182 may be larger than the fan 184, or vice versa. The fans 182 and 184 are controlled by respective motors 186 and 188. The motors 186 and 188 may have the same maximum power output or different maximum power outputs depending on the power requirements for driving the fans 182 and 184. For example, if the fan 182 is larger than the fan 184, the motor 186 may be larger than the motor 188 in order to drive the fan 182.

The motors 186 and 188 are controlled by the controller 150. In the illustrated embodiment, the controller 150 includes a processor 152, such as the illustrated microprocessor, and a memory device 154. The controller 150 may also include one or more storage devices and/or other suitable components. The processor 152 may be used to execute software, such as software for independently controlling the speed of the motors 186 and 188, if the motors are variable speed drive motors (VSD), and/or turning the motors 186, 188 on and off if one or more both of the motors 186, 188 are not variable speed drive motors. For example, in some embodiments, both motors 186 and 188 may not be variable speed drive motors. The controller 150 may therefore repeatedly turn one or both of the motors 186 and 188 on and off to control heat transfer from the refrigerant in the condenser 130, and thus the flow of refrigerant to the reheat coil 122. In some embodiments, the controller 150 may continuously run the motor 186 while turning the motor 188 on and off to vary heat transfer from the refrigerant in the condenser 130 or vice versa. In some embodiments, the controller 150 may alternate which motor 186 or 188 is turned off in order to use the motors 186, 188 more or less equally. In still other embodiments, one motor 186 or 188 may be a variable drive motor while the other is not. In this embodiment, one motor 186 or 188, may operate continuously while increasing and decreasing the speed of the variable speed drive motor to vary heat transfer from the condenser 130. Regardless of the embodiment, the processor 152 may include multiple microprocessors, one or more "general-purpose" microprocessors, one or more special-purpose microprocessors, and/or one or more application specific integrated circuits (ASICS), or some combination thereof. For example, the processor 152 may include one or more reduced instruction set (RISC) processors.

The memory device 154 may include a volatile memory, such as random access memory (RAM), and/or a nonvolatile memory, such as read-only memory (ROM). The memory device 154 may store a variety of information and may be used for various purposes. For example, the memory device 154 may store processor executable instructions, such as firmware or software, for the processor 152 to execute, such as instructions for interpreting signals from one or more sensors 156. For example, the controller 150 may couple to one or more sensors 156 that provide feedback regarding the humidity and/or temperature of the supply air stream 120 exiting the evaporator system 134. As the controller 150 receives feedback, the controller 150 may execute instructions stored by the memory device 154 to turn the motors 186 and/or 188 on, turn the motors 186 and/or 188 turn off, increase the speed of the motors 186 and/or 188, or decrease the speed of the motors 186 and/or 188 to control the amount of heat transfer from the refrigerant in the condenser 130.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, including those unrelated to the presently contemplated best mode of carrying out the present disclosure, or those unrelated to enabling the claimed subject matter. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vapor compression system, comprising:
   a reheat coil configured to heat a supply air stream with a refrigerant;
   a fan configured to force an environmental air flow across a condenser to remove energy from the refrigerant;
   a motor coupled to the fan; and
   a controller configured to adjust a speed of the fan based on feedback from a sensor to control an amount of the refrigerant flowing through the reheat coil in order to adjust a parameter of the supply air stream, wherein:
      in response to the feedback from the sensor indicating that a value of the parameter of the supply air stream is below a target value, the controller is configured to control the motor to deactivate the fan or to decrease the speed of the fan to effectuate an increase in the value of the parameter of the supply air stream; or
      in response to the feedback from the sensor indicating that the value of the parameter of the supply air stream is above the target value, the controller is configured to control the motor to activate the fan or to increase the speed of the fan to effectuate a decrease in the value of the parameter of the supply air stream; or both.

2. The vapor compression system of claim 1, comprising a compressor configured to receive the refrigerant and direct the refrigerant to the reheat coil via one or more conduits, wherein the vapor compression system excludes a valve positioned along the one or more conduits and between the compressor and the reheat coil.

3. The vapor compression system of claim 1, comprising:
   a compressor configured to receive the refrigerant; and
   an evaporator coil configured to cool the supply air stream, wherein the compressor is configured to direct the refrigerant to the evaporator coil via one or more conduits, wherein the vapor compression system excludes a valve positioned along the one or more conduits and between the compressor and the evaporator coil.

4. The vapor compression system of claim 1, wherein the motor is a variable speed drive motor, wherein the controller is coupled to the variable speed drive motor and is configured to control the variable speed drive motor to control the speed of the fan.

5. The vapor compression system of claim 1, comprising the sensor, wherein the sensor is configured to provide the controller with the feedback, wherein the feedback is indicative of a temperature of the supply air stream.

6. The vapor compression system of claim 5, wherein the sensor is configured to measure the temperature of the supply air stream as the supply air stream exits an evaporator coil of the vapor compression system.

7. The vapor compression system of claim 5, wherein the sensor is a first sensor, and the vapor compression system comprises a second sensor configured to provide the controller with additional feedback indicative of a temperature of the refrigerant.

8. The vapor compression system of claim 7, wherein the second sensor is configured to measure the temperature of the refrigerant as the refrigerant exits the reheat coil.

9. The vapor compression system of claim 8, wherein the controller is coupled to the second sensor and is configured to use the additional feedback from the second sensor to control the speed of the fan.

10. A vapor compression system, comprising:
    a first coil configured to cool a supply air flow with a refrigerant;
    a second coil configured to heat the supply air flow with the refrigerant;
    a compressor configured to supply the first coil and the second coil with the refrigerant;
    a fan configured to force an environmental air flow across a condenser to remove energy from the refrigerant;
    a sensor configured to provide the controller with feedback indicative of a parameter of the supply air flow; and
    a controller configured to adjust a speed of the fan based on the feedback to control an amount of the refrigerant flowing through the second coil in order to adjust the parameter of the supply air flow, wherein, in response to the feedback from the sensor indicating that a value of the parameter of the supply air flow deviates from a target value, the controller is configured to adjust the speed of the fan to effectuate an increase or decrease in the value of the parameter of the supply air flow.

11. The vapor compression system of claim 10, comprising one or more conduits extending between the compressor and the second coil, wherein the one or more conduits are configured to receive a portion of the refrigerant from the compressor and direct the portion of the refrigerant to the second coil, and wherein the vapor compression system excludes a valve positioned along the one or more conduits and between the compressor and the second coil.

12. The vapor compression system of claim 11, comprising one or more additional conduits extending between the compressor and the first coil, wherein the one or more additional conduits are configured to receive a remaining portion of the refrigerant from the compressor and direct the remaining portion of the refrigerant to the first coil, and wherein the vapor compression system excludes a valve positioned along the one or more additional conduits between the compressor and the first coil.

13. The vapor compression system of claim 10, comprising a motor coupled to the fan, wherein the controller is coupled to the motor and is configured to control the motor to activate or deactivate the fan to control the amount of the refrigerant flowing through the second coil based on the feedback from the sensor.

14. A vapor compression system, comprising:
a reheat coil configured to receive a first portion of a refrigerant flow from a compressor to heat a first fluid flow across the reheat coil;
a condenser fluidly coupled to the compressor and configured to receive a second portion of the refrigerant flow from the compressor;
a first fan configured to force a second fluid flow across the condenser;
a second fan configured to force the second fluid flow across the condenser; and
a controller configured to control a first speed of the first fan and/or a second speed of the second fan based on feedback from a sensor to adjust diversion of the first portion of the refrigerant flow to the reheat coil and the second portion of the refrigerant flow to the condenser without utilizing a valve, wherein, in response to the feedback from the sensor indicating that a value of a parameter of the first fluid flow is below a target value, the controller is configured to control a first motor of the first fan to deactivate the first fan or to decrease the first speed of the first fan to effectuate an increase in the value of the parameter of the first fluid flow, or, in response to the feedback from the sensor indicating that the value of the parameter of the first fluid flow is above the target value, the controller is configured to control the first motor to activate the first fan or to increase the first speed of the first fan to effectuate a decrease in the value of the parameter of the first fluid flow, or both.

15. The vapor compression system of claim 14, comprising the sensor configured to provide the feedback, wherein the feedback is indicative of a temperature of the first fluid flow.

16. The vapor compression system of claim 14, comprising the compressor and an evaporator coil configured to cool the first fluid flow with the refrigerant flow, wherein the vapor compression system excludes the valve between the compressor and the reheat coil and between the compressor and the evaporator coil.

17. A vapor compression system, comprising:
a coil configured to heat a supply air stream with a refrigerant flowing therethrough;
a fan configured to force an environmental air flow across a condenser to remove energy from the refrigerant;
a motor coupled to the fan; and
a controller configured to adjust a speed of the fan based on feedback from a sensor to control an amount of the refrigerant flowing through the coil without utilizing a valve, wherein the controller is configured to:
control the motor to deactivate the fan or to decrease the speed of the fan to effectuate an increase in a value of a parameter of the supply air stream in response to the feedback from the sensor indicating that the value of the parameter of the supply air stream is below a target value; or
control the motor to activate the fan or to increase the speed of the fan to effectuate a decrease in the value of the parameter of the supply air stream in response to the feedback from the sensor indicating that the value of the parameter of the supply air stream is above the target value; or both.

18. The vapor compression system of claim 17, comprising a compressor configured to direct the refrigerant from an outlet of the compressor to the coil via one or more conduits, wherein the vapor compression system excludes the valve positioned along the one or more conduits and between the outlet of the compressor and the coil.

19. The vapor compression system of claim 18, comprising an evaporator coil configured to cool the supply air stream, wherein the compressor is configured to direct the refrigerant from the outlet of the compressor to the evaporator coil via one or more additional conduits, wherein the vapor compression system excludes the valve positioned along the one or more additional conduits and between the outlet of the compressor and the evaporator coil.

20. The vapor compression system of claim 17, wherein the motor is a variable speed drive motor, wherein the controller is coupled to the variable speed drive motor and is configured to control the variable speed drive motor to control the speed of the fan.

21. The vapor compression system of claim 17, comprising the sensor, wherein the sensor is configured to provide the controller with the feedback, wherein the feedback is indicative of a temperature of the supply air stream.

22. The vapor compression system of claim 1, wherein the parameter comprises a humidity of the supply air stream or a temperature of the supply air stream.

23. The vapor compression system of claim 1, wherein the parameter comprises a temperature of the supply air stream.

24. The vapor compression system of claim 14, wherein the controller is configured to operate the first fan continuously and to initiate or block operation of the second fan based on the feedback from the sensor to adjust diversion of the first portion of the refrigerant flow to the reheat coil and the second portion of the refrigerant flow to the condenser.

25. The vapor compression system of claim 14, wherein the controller is configured to alternatingly initiate or block operation of the first fan and the second fan based on the feedback from the sensor to adjust diversion of the first portion of the refrigerant flow to the reheat coil and the second portion of the refrigerant flow to the condenser.

* * * * *